Jan. 18, 1944. A. G. LARSON 2,339,415
BRAKE DEVICE
Filed Dec. 20, 1941 3 Sheets-Sheet 1
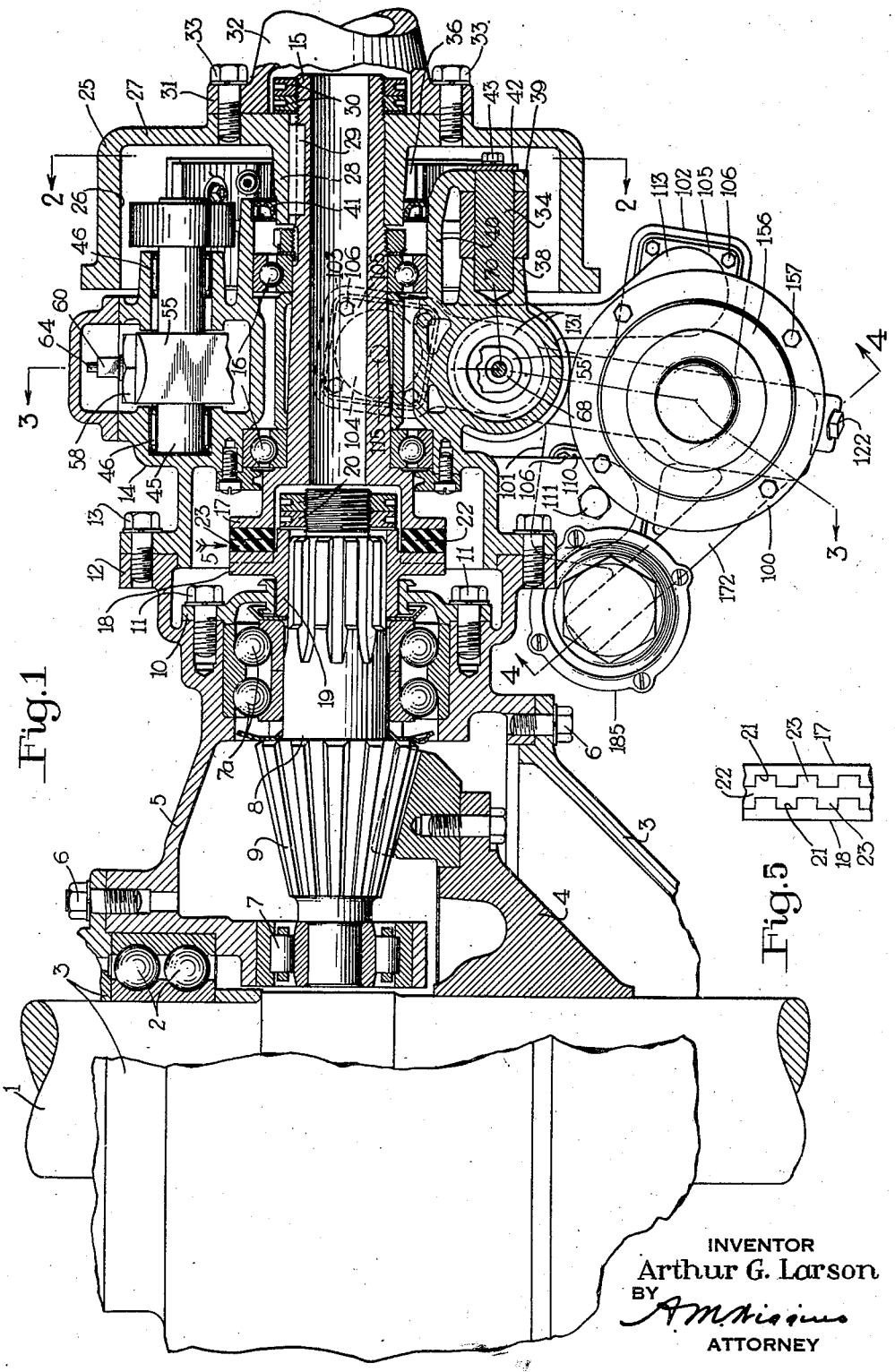
INVENTOR
Arthur G. Larson
BY
ATTORNEY

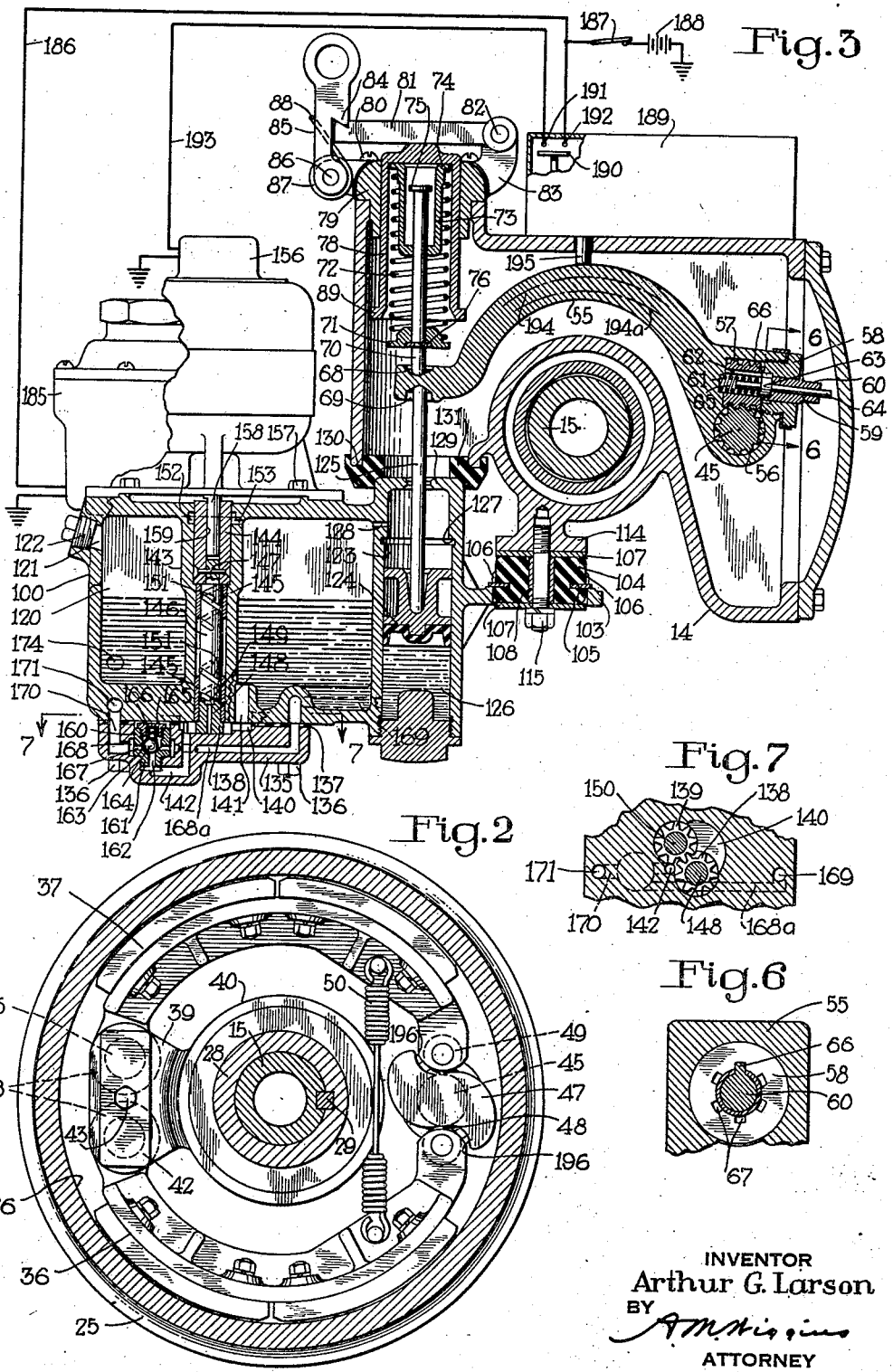

Jan. 18, 1944. A. G. LARSON 2,339,415
BRAKE DEVICE
Filed Dec. 20, 1941 3 Sheets-Sheet 3

INVENTOR
Arthur G. Larson
BY
ATTORNEY

Patented Jan. 18, 1944

2,339,415

UNITED STATES PATENT OFFICE 2,339,415

BRAKE DEVICE

Arthur G. Larson, Forest Hills, Pa., assignor to The Westinghouse Air Brake Company, Wilmerding, Pa., a corporation of Pennsylvania Application December 20, 1941, Serial No. 423,798

12 Claims. (Cl. 188—170)

This invention relates to vehicle brakes and more particularly to the type in which the brakes are applied by the stored energy of spring means and released by suitable power means against the opposing force of said spring means.

One object of the invention is the provision of an improved brake of the above type.

Another object of the invention is the provision of an improved fluid pressure control system for releasing and controlling a spring applied brake.

Another object of the invention is the provision of a spring-applied hydraulically-released brake in which all parts of the hydraulic portion of the system are so arranged so as to minimize the possibility of leakage and thereby loss of the actuating fluid.

Another object of the invention is the provision of a spring-applied hydraulically-released brake structure for direct association with a member to be braked, such as a vehicle axle, and in which all parts of the hydraulic portion of the structure are contained in a single resiliently supported unit so as to minimize the possibility of leakage and thereby loss of actuating liquid and to also protect said portion against undue wear and damage incident to vibration of the supporting portion of the vehicle.

Another object of the invention is the provision of a relatively simple, small, compact and efficient spring-applied hydraulically-released brake in which the possibility of leakage and thereby loss of actuating liquid is reduced to a minimum and in which the hydraulic control parts of the system are protected against damage by vibration so as to thereby render the brake particularly practicable for use on railcars or the like.

Another object of the invention is the provision of an improved spring-applied fluid-pressure-released brake system embodying means for manually releasing the brake in case of failure of the fluid pressure release parts of the system.

Other objects and advantages will be apparent from the following more detailed description of the invention.

Figure 4:
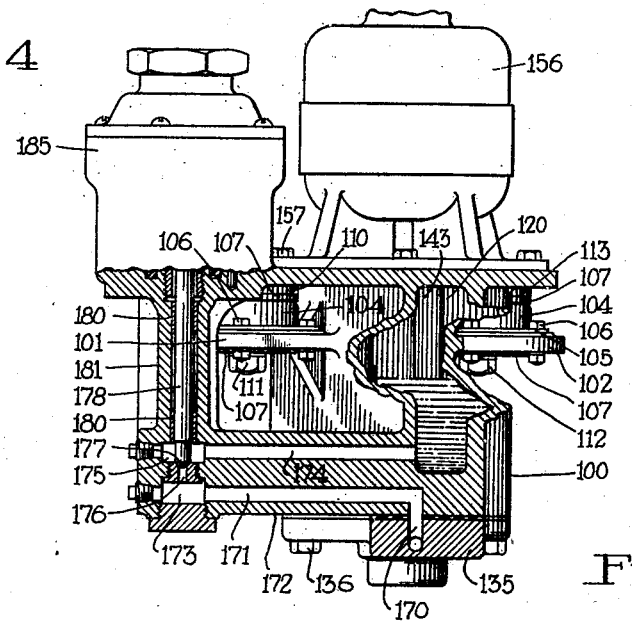
Figure 8:
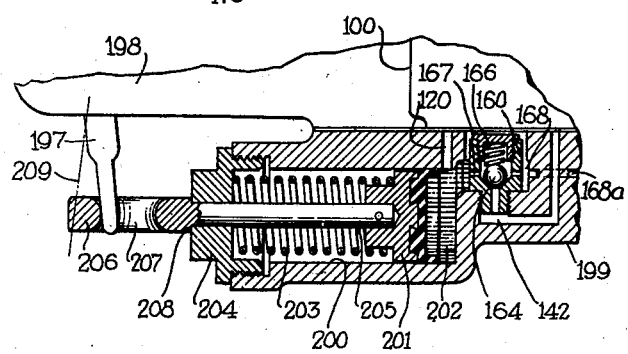
Figure 9:
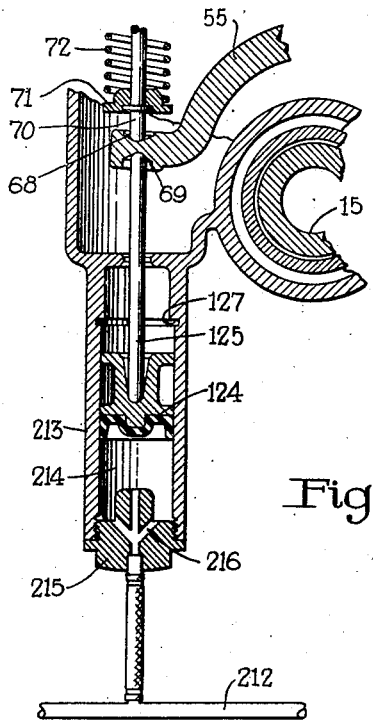

In the accompanying drawings, Fig. 1 is a plan view, partly in section and partly in outline, of a portion of one end of a vehicle truck embodying an axle to be braked and one form of the improved brake structure; Figs. 2, 3, and 4 are sectional views taken respectively on lines 2—2, 3—3, and 4—4 in Fig. 1; Fig. 5 is a side view of a portion of the structure looking in the direction of arrow 5 in Fig. 1; Figs. 6 and 7 are sectional views taken on the lines 6—6 and 7—7 in Fig. 3; Fig. 8 is a sectional view of a modification of the invention; and Fig. 9 is a sectional view of another modification of the invention.

Description

As shown in Fig. 1 of the drawings, the improved brake structure is associated with a shaft 1 which is to be braked. For the purpose of illustration, the shaft may be a drive axle of a railway vehicle and therefore at each of its opposite ends be supported in and have driving connections with oppositely arranged flanged wheels for rolling on track rails. In view of the fact however that such structures are so well known and also for the purpose of simplicity the wheels and rails have been omitted.

Through the medium of one or more anti-friction bearings 2 the axle 1 carries an axle housing 3. A ring gear 4 is mounted on the axle 1 within the housing 3 and has a driving connection with said axle. An opening in one side of the housing 3 is closed by a cover 5 which is removably secured in place by cap screws 6. This cover carries a pair of spaced anti-friction bearings 7 and 7a in which there is mounted a shaft 8 arranged at right angles to the axle 1 and provided between said bearings with a pinion gear 9 having driving contact with the ring gear 4. A combined cover and adjustment element 10 mounted over the outer end of the pinion shaft 8 and bearing against the anti-friction bearing 7a is removably secured against the outer end of cover 5 by cap screws 11.

The cover 5 has an annular flange 12 of greater diameter than the cap 10 and extending outwardly beyond said cap and removably secured to this flange by cap screws 13 is a brake housing 14. Disposed in this housing in axial alignment with the pinion shaft 8 is a combined brake and propulsion shaft 15 which is supported in spaced anti-friction bearings 16 carried in the housing. The inner end of shaft 15 is provided with an outwardly extending annular flange 17 arranged adjacent a corresponding flange 18 provided on a member 19 having a splined driving connection with the outer end of the pinion shaft 8 and which is secured in place on said shaft by a pair of nuts 20 having screw threaded contact therewith. The adjacent face of both flanges 17 and 18 are provided with a plurality of radial slots 21 (Fig. 5) and interposed between these flanges is a flexible coupling or disk 22 having on its opposite faces staggered ribs 23 fitting in the slots 21 of the two couplings to provide a flexible driving connection between the shaft 15 and pinion shaft 8.

Beyond the end of the brake housing 14 opposite that connected to flange 12 is a brake drum 25 having interiorly a cylindrical braking surface 26. The drum 25 is secured at one end to an inwardly extending radial flange 27 joining said drum to an integral, concentrically arranged sleeve 28 which is mounted on the shaft 15 and has a driving and braking connection therewith through the medium of a key 29. Nuts 30 are provided on the end of shaft 15 for securing the brake drum 25 to said shaft.

The numeral 32 designates a propeller shaft for the vehicle and this shaft has at its power delivery end a flange 31 which encircles the nuts 30 and which is removably secured by cap screws 33 to the radial flange 27 of the brake drum. The other end of the drive shaft 32 may be connected to a propulsion motor of the vehicle and, as will be apparent, power applied by said motor to shaft 32 will be transmitted to the drive axle 1 for turning same to propel the vehicle, through flange 27 of the brake drum, sleeve 28, shaft 15, flange 17, coupling disk 22, flange 18, pinion shaft 8, pinion gear 9, and ring gear 4. It will also be noted that braking force applied to surface 26 of the brake drum 25 is also adapted to be transmitted through the shaft 15, pinion shaft 8, pinion gear 9, and ring gear 4 to the axle 1 for braking same.

At one side of the combined brake and propulsion shaft 15 and at the right-hand end of the brake housing 14, as viewed in Fig. 1, there are provided two fulcrum pins 34 and 35 disposed within the brake drum 25 and upon which are pivotally mounted the adjacent ends of two brake shoes 36 and 37 respectively, which are arranged for frictional braking contact with surface 26 of said drum. The inner ends of the pins 34 and 35 are supported in bosses 38 projecting from the brake housing 14 while the outer ends of said pins are supported in an arm 39 which projects from the outer end of a ring-like extension 40 of the brake housing. A plate 42 is removably secured by a cap screw 43 to the outer surface of the arm 39 over the ends of pins 34 and 35 for holding same in place.

In Fig. 1 it will be noted that the extension 40 constitutes a support for one of the anti-friction bearings 16 and extends over the adjacent end of the brake drum sleeve 28, and between the inner surface of this extension and the outer surface of said sleeve is interposed an oil seal 41 for blocking passage of lubricant from the bearing 16 to the brake drum 25.

Diametrically opposite the cap screw 43 is disposed a brake operating rock shaft 45 which extends parallel to the shaft 15 and which is supported in suitable anti-friction bearings 46 carried by the brake housing 14. One end of shaft 45 extends into the space between the ends of the brake shoes 36 and 37 opposite the fulcrum pins 34 and 35 and therein is provided with a cam 47. A roller 48 in the end of shoe 36 engages one side of the cam 47 and a like roller 49 in the end of shoe 37 engages the opposite side of the cam 47. Rotation of the brake shaft 45 and cam 47 in a counterclockwise direction, as viewed in Fig. 2, is adapted to urge the adjacent ends of the two brake shoes 36 and 37 apart for thereby moving said shoes into frictional contact with surface 26 on the brake drum 25 for braking the axle 1, while rotation of said shaft and cam in the opposite direction is adapted to permit movement of said brake shoes out of contact with said drum for releasing the brake on axle 1, as will be apparent. The two brake shoes are connected by a spring 50 disposed at the side of shaft 15 adjacent the cam 47 for pulling the brake shoes out of contact with the drum upon brake release operation of the cam 47, just described.

A substantially semi-circular brake lever 55 extends over or straddles the combined brake and drive shaft 15 at substantial right angles to its axis, as shown in Fig. 3, and has one end journaled on the brake shaft 45. Within this journaled end, the brake shaft 45 is provided around its periphery with gear teeth 56 which mesh with corresponding helical teeth provided on a gear 57 which is journaled in a bore in the end of the lever and which is arranged with its axis at right angles to that of the brake shaft 45. Engagement between these gear teeth is adapted to provide a rigid drive connection between the brake lever 55 and the brake shaft 45 whereby upon movement of the lever in a counterclockwise direction about the axis of shaft 45, as viewed in Fig. 3, said shaft and the brake cam 47 will be operated to move the brake shoes 36 and 37 into braking contact with the brake drum 25 for braking the axle 1.

A cap 58 is secured to the brake lever closing the end of the bore in which gear 57 is disposed and also engaging said gear for holding same against axial movement. The gear 57 is provided with an axial extension 59 extending through a central bore in the cap 58 to beyond the outer end of said cap. The outer end of the extension 59 is provided with a part 60 to which a wrench is adapted to be applied for turning the gear 57 within the lever to thereby rotate the brake shaft 45 and braking cam 47 relative to said lever for adjusting the brake shoes 36 and 37 relative to the braking surface 26 on the drum, to compensate for wear of said shoes and thus maintain the various positions of the lever 55 substantially the same throughout the life of the brake shoes.

The gear 57 has an axial bore 61 and opening into the side of said bore is a parallel arranged slot 62. A plunger 63 is slidably mounted in the bore 61 and has a stem 64 extending axially through the extension 59 of the gear to beyond the outer end of said extension. A spring 65 contained in the bore 61 is effective on the plunger 63 for urging it to its outer position shown. The plunger 63 has at one side an outwardly extending tongue 66 adapted to slide in the slot 62 and to enter one or another of a plurality of spaced slots 67 (Fig. 6) provided in the inner end of the cap 58. The slots 67 are of such depth that when the tongue 66 is in engagement with the bottom of one or another a portion of the tongue will also be disposed in the slot 62 in gear 57 to thereby secure the gear to the nut 58 and against rotation. In order to turn the gear 57 to take up slack or compensate for wear of the brake shoes 36 and 37, it is therefore necessary to move the plunger 63, through the medium of the pin 64, against the spring 65 to a position entirely within the gear 57. Such movement may be effected independently of the wrench employed on the part 60 of the gear extension 59 for turning same, or the wrench may be of such type as to effect such movement in the act of applying the wrench to said extension.

The end of the brake lever 55 opposite that connected to the brake shaft 45 extends generally parallel to the ground and in the upper surface is provided with a recess 68 and in the lower surface an oppositely disposed recess 69. One end of a brake applying pin 70 engages the lever 55 within the recess 68 and secured to this pin adjacent the end engaging said lever is an annular seat 71 upon which acts one end of a brake application spring 72, which is preferably of the helical coil type. The pin 70 above the spring seat 71 extends through spring 72 and an opening provided centrally through the closed end of a cup-shaped retainer 73 which around its open end has an annular flange 74 engaged by the opposite end of the spring 72. Within the retainer 73 the end of pin 70 is provided with an enlargement 75 adapted to engage the closed end of the retainer for anchoring these two parts together to facilitate mounting of the seat 71 on the pin 70 with the spring 72 under a chosen degree of compression during the process of assembling these parts. It will be noted that the seat 71 is connected to the pin 70 through the medium of a washer 76 extending into an annular recess in the pin and an aligned recess in the lower face of said seat and this washer may be of the usual horseshoe type requiring movement of the seat against the spring to beyond the recess in the pin for its application.

The portion of spring 72 above the seat 71 and the retainer 73 are contained in a sleeve 78 arranged concentric therewith and slidably mounted in a suitable bore provided in a cover 79 which is removably secured by screws 80 to the top portion of the brake housing 14. The outer end of the sleeve 78 is adapted to engage a lever 81 which at one side of the sleeve has a fulcrum connection with a pin 82 carried by an arm 83 extending from the cover 79. The opposite end of the lever 81 has a recess for interlocking engagement with a finger 84 which projects from one side of a vertically extending latch 85. The latch 85 is fulcrumed at its lower end on a pin 86 carried by an arm 87 projecting from the cover 79. The opposite end of the latch 85 is ring-shaped to receive the finger of an operator for pulling said latch and thereby finger 84 out of interlocking relation with the lever 81. A torsion spring 88 having one end anchored to the arm 87 projecting from the cover 79 is disposed to act on the latch 85 for urging same in the direction for interlocking with the lever 81.

From the above description it will be seen that the lever 81, when held in the position shown in Fig. 3 by latch 85, acts as a stop for one end of the brake applying spring 72 to render said spring effective through pin 70 on brake lever 55 to turn the brake shaft 45 in the direction for applying the brake on the vehicle. Manual release of the latch 85 from the lever 81 is however adapted to permit the sleeve 78 to move upwardly and outwardly of the brake housing under the action of spring 72 to thereby relieve the pressure of said spring on the brake lever 55 in order to release an application of brakes effected by said spring or to render said spring ineffective to apply the brakes. To restore the brake applying spring 72 to its effective condition shown, it is merely necessary to rock the lever 81 in a counterclockwise direction, as viewed in Fig. 3, until its free end is moved to below the finger 84 projecting from the latch 85 at which time the torsion spring 88 will rock the latch 85 into locking relation with lever 81 to thereby hold the brake applying spring 72 in its operative condition shown.

The inner or lower end of sleeve 78 is provided with an annular flange 89 adapted to engage the inner end of cover 79 to prevent the force of spring 72 moving sleeve 78 out of the cover 79 upon manual release of latch 85 from the lever 81, this flange allowing such travel of the sleeve 78 under such a condition however as to permit full expansion of spring 72 and thereby full removal of spring pressure on the brake lever 55, so as to insure a complete release of the brake.

For compressing the spring 72 to release the brake and for controlling its operation to apply the brake on axle 1, a control valve device 100 is provided which comprises a casing having three spaced and substantially horizontally extending arms 101, 102, and 103, and disposed and freely movable in a suitable vertical bore through each of these arms is a cylindrical resilient member 104 made from rubber or the like. Secured in each of the members 104 and extending radially from the periphery thereof is a mounting plate 105 engaging the upper surface of the respective arm 101, 102, or 103 and rigidly secured to said arm by cap screws 106. A metal plate 107 is mounted against both the top and bottom ends of each of the members 104 and the two plates on each member engage the opposite ends of a metal sleeve 108 extending through a suitable central aperture in the member and opening at opposite ends to aligned bores through the two plates, the lower plate 107 being of the same diameter as the member as to be capable of free movement through the bore in the respective arm 101, 102, or 103.

The arm 101 and resilient member 104 associated therewith are disposed below an arm 110 projecting from the brake housing 14 and a bolt 111 extends through said resilient member, the sleeve 108 therein and the arm 110 rigidly securing said sleeve and the plates 107 at the opposite ends to the arm 110.

In a like manner the arm 102 extending from the control valve device 100 is connected through the medium of the resilient member 104 associated therewith and a bolt 112 to an arm 113 extending from the brake housing 14 and disposed above the respective resilient member 104. The third arm 103 projecting from the control valve device 100 and the associated resilient block 104 are disposed under a lug 114 extending from the brake housing 14 substantially below the brake and propulsion shaft 15 and are rigidly secured to said lug by a stud 115. It will thus be apparent that the control device 100 is resiliently supported by the brake housing 14 through the medium of the three resilient members 104 which are adapted to absorb vibration and thus prevent the transfer thereof from the brake housing 14 to the control valve device 100.

As above mentioned, the control valve device 100 is provided for releasing the brake against the action of spring 72 and for controlling the application of said brake by said spring. This control is preferably attained hydraulically and to this end the control valve device embodies a suitable reservoir or sump 120 adapted to contain a hydraulic control medium such as oil. In one side of the casing is an opening 121 for filling the reservoir 120 with the desired amount of fluid, this opening being normally closed by a plug 122.

At one side of the reservoir 120 the casing has a piston bore 123 arranged below the brake lever 55 and in substantial coaxial alignment with the brake applying spring 72 and enclosing sleeve 78. A piston 124 is slidably mounted in the bore 123 and a pin or strut 125 has one end in engagement with said piston within a recess in one side thereof while the opposite end of said strut engages brake lever 55 within recess 69. At the opposite face of piston 124 is a pressure chamber 126 adapted to receive liquid under pressure for controlling operation of the brake lever 55 by spring 72. The bore 123 terminates above the piston 124 in an annular shoulder 127 adapted to be engaged by the piston for limiting outward movement thereof under the action of liquid pressure in chamber 126 upon manual release of lever 81 from the latch 85 or due to any other reason which might permit movement of the piston 124 in an upwardly direction beyond its normal uppermost position substantially as shown in the drawings. The chamber above the piston 124 is open through a relief port 128 to reservoir 120 in order that any oil which may leak past the piston may flow back to said reservoir.

The strut 125 loosely extends through an opening provided in the end of an annular boss 129 projecting from the top of the casing of the control valve device 100. This boss is disposed somewhat below but in coaxial relation with an annular rib 130 projecting downwardly from the brake housing 14, and interposed between and having sealing contact with the end of said rib and the corner of said boss is a resilient gasket 131, it being noted that this gasket is provided with a central opening through which the strut 125 loosely extends. This gasket provides a leak tight seal between these two parts of the brake in order to exclude foreign matter and being resilient prevents or minimizes the transfer of vibration from the brake housing 14 to the control device 100.

A cover 135 is removably secured by bolts 136 against the under surface of the casing of the control valve device 100, a gasket 137 being interposed between said cover and surface to obtain an oil tight joint. The cover 137 is provided in its inner face with suitable recesses for the reception of inter-meshing, driving and driven gears 138 and 139 of a gear type liquid displacement pump, the pump inlet side of the two gears being open to a cavity 140 in the cover which cavity is open to the lower end of a port 141 leading to the reservoir 120 adjacent the bottom thereof. At the opposite side of the gears is a discharge port 142, and it will be apparent from an inspection of Fig. 7 that upon clockwise rotation of the driving gear 138 both gears will act to draw oil from the reservoir 120 through the cavity 140 and to discharge same into the outlet port 142.

The driving gear 138 is disposed beneath a post 143 extending vertically through the oil reservoir 120 from the bottom to the top thereof. In the upper portion of this post there is a bore in which is journaled a coupling sleeve 144 and below this sleeve there is another or lower bore extending to the bottom of the post. A bearing sleeve 145 is provided at both the upper and lower ends of this lower bore in coaxial relation with the coupling sleeve 144 and driving gear 138.

A pump drive shaft 146 extends between and is journaled at opposite ends in the two sleeves 145, the upper end of this shaft being of reduced section and extending into a bore provided through the coupling 144. A pin 147 extends through the lower end of the coupling 144 and the telescoped portion of the drive shaft 146 securing said shaft for rotation with said coupling. The drive shaft 146 terminates short of the lower end of the lower sleeve 145 and extending into the lower end of said sleeve is a stub shaft 148 projecting from the driving gear 138. In the end of the stub shaft 148 is a slot in which is disposed a tongue 149 on the lower end of the drive shaft 146 to thereby provide a driving connection between said shaft and gear 138. The driven gear 139 also has a stub shaft 150 which is adapted to be journaled in a bore (not shown) provided in the lower wall of the oil reservoir 120.

The drive shaft 146 is provided adjacent each of its opposite ends with a spiral groove 151 so formed as to urge oil in the direction of the driving gear 138 upon operation of the oil pump to thereby minimize the passage of oil upwardly past said shaft and the coupling 144. Adjacent the top of the coupling 144 the post 143 is provided with an annular groove 152 encircling the coupling for receiving any oil which may leak from the pump up past the drive shaft 146 and said coupling, and said groove is open through a relief port 153 to the top of the oil reservoir 120 for draining any collected oil from said groove back to said reservoir.

A vertically operating electric motor 156 is secured by cap screws 157 to the top of the housing of the control valve device 100 with the motor shaft 158 extending into the bore in coupling 144. One side of the shaft 158 may be cut away to provide a flat surface 159 and the opening in the coupling 144 may be similarly shaped to thereby attain a driving connection between the motor and coupling.

A check valve cage 160 having at its lower end a boss 161 is disposed in the cover 135 with the boss 161 in screw-threaded contact with the wall of a suitable bore therein. In the boss 161 is a port 162 which is open at its lower end to the discharge passage 142 from the gear driven pump while its upper end is open through a valve seat to a chamber 163 containing a ball check valve 164 adapted to cooperate with said seat to prevent flow of liquid in the direction from said chamber to the discharge passage 142. The upper end of chamber 163 is closed by a cap 165 having screw threaded contact with the valve cage, and interposed between said cap and the check valve 164 is a light bias spring 166 for urging the check valve into engagement with its seat.

The check valve chamber 163 is open through one or more ports 167 to an annular cavity 168 formed around the exterior of the cage 160. The cavity 168 is in constant communication with pressure chamber 126 at the lower side of piston 124 through a passage 168a in the cover 135 and a connected passage 169 in the casing of the control device, the passage 169 being provided through a rib formed in the lower wall of the oil reservoir 120.

The cavity 168 encircling the valve cage 160 is also open through a port 170 in the cover 135 to a passage 171 formed in a rib 172 and leading to a chamber 173. Disposed above and extending parallel to the passage 171 in rib 172 is a passage 174 open at one end to the oil reservoir 120 and at the opposite end to a chamber 175 provided above the chamber 173. A bore 176 is provided for establishing communication between the chambers 173 and 175 and at the end of this bore adjacent the chamber 175 there is provided a tapered valve seat adapted to be engaged by a valve 177 for closing this communication.

The valve 177 is formed on the lower end of a vertically movable shaft 178 which is slidably mounted in two spaced bushings 180 provided at opposite ends of a bore extending through a post 181 which connects the rib 172 at its lower end to the top portion of the housing. Associated with this top portion of the housing is an electromagnet 185 arranged to control vertical movement of the shaft 178 and thereby operation of the valve 177. Energization of the magnet 185 is adapted to seat the valve 177 against the pressure of liquid discharged by the gear pump and acting in chamber 173 below the valve while upon deenergization of said magnet such pressure is adapted to move the valve from its seat in order that liquid may flow in the direction from chamber 173 to chamber 175.

As shown in Fig. 3, one terminal of the magnet 185 may be connected to ground while the other terminal may be connected to a wire 186 leading to one contact of a manually operative switch 187. The other contact of this switch may be connected to any suitable source of electric current, such as a battery 188 by way of illustration. When the switch 187 is closed, the magnet 185 will be energized and the valve 177 seated, as will be apparent.

Mounted on the housing of the control device 100 directly over the brake operating lever 55 is a switch device 189 preferably any conventional snap acting type, having a movable electric contact 190 arranged to cooperate with two fixed contacts 191 and 192. The fixed contact 191 is connected by a wire 193 to one terminal of the electric motor 156, the other terminal of which is grounded, while the fixed contact 192 is connected to wire 186 leading to the manual control switch 187. Thus when the manual control switch 187 is closed and the movable contact 190 in the switch device 189 is also closed, electric current will be supplied to the electric motor 156 for causing said motor to operate the gear pump.

The operation of the switch device 189 is controlled by a plunger 195 the lower end of which is disposed for engagement by the brake lever 55. In Fig. 3 of the drawings the brake lever 55 is shown in a position which will be assumed when the brake is released, and when so positioned, the plunger 195 is adapted to be also positioned as shown for effecting movement of the movable contact 190 out of engagement with the fixed contacts 191 and 192. The brake is adapted to be held released during movement of the lever 55 from the position shown to a position such as indicated by a dot and dash line 194. Movement from the line 194 in the direction of a second dot and dash line 194a is however adapted to effect an application of the brake. The plunger 195 is adapted to move with the lever 55 from the position shown to the position indicated by the dot and dash line 194 and at substantially the time this latter position is obtained, the plunger 195 is adapted to effect operation of the switch device 189 to cause movement of the contact 190 into engagement with the fixed contacts 191 and 192.

*Operation*

Let it be assumed that the manual switch 187 is in the circuit closing position shown for effecting energization of the electromagnet 185 and thereby closing of the valve 177. Let it also be assumed that the movable brake lever 55 is in such a position that the movable switch contact 190 in the switch device 189 is in its circuit closing position bridging the fixed contacts 191 and 192 to thereby supply electrical energy to the motor 156 for causing said motor to drive the gears 138 and 139 in the gear pump.

This operation of the pump draws oil from the reservoir 120 and discharges same into the pump outlet passage 142 and when the pressure of such liquid acting on the ball check valve 162 sufficiently exceeds the opposing force of bias spring 166, said check valve unseats to permit the flow of liquid discharged by the pump into the check valve chamber 163 and thence through the port 167 to the annular chamber 168. With the valve 177 seated the discharge of liquid from the pump back to the sump or reservoir 120 is prevented as will be apparent, so that the liquid pumped past the check valve can only flow through the passages 168a and 169 to pressure chamber 126 below the piston 124.

When the pressure of liquid acting on the piston 124 is thus increased sufficiently to overcome the opposing force of the brake application spring 72, said piston is moved in an upwardly direction thereby compressing said spring and moving the brake lever 55 and brake shaft 45 in a clockwise direction. After the brake lever 55 passes the line 194a further movement moves the pin 195 into the switch device 189 and when the lever and thereby said pin obtain the position shown, the switch 189 is adapted to act to effect movement of the movable contact 190 out of bridging relation with the fixed contacts 191 and 192 to thereby cause the motor 156 to stop operating the pump gears 138 and 139. With the pump thus stopped, the check valve 164 becomes effective to prevent the flow of liquid under pressure from chamber 126 below the piston 124 back to the gear pump and through same to the reservoir 120.

If with the pump stopped the liquid under pressure in chamber 126 should leak away, the brake application spring 72 will gradually move said piston downwardly according to said leakage and if the leakage becomes sufficient for the brake lever 55 to be moved from the position shown to that indicated by the dot and dash line 194 the switch device 189 will operate to again close the circuit to the motor 156 for operating the gear pump to replenish the liquid under pressure in chamber 126, and when thus restored to its original degree the switch 189 will again operate to stop the motor 126.

In other words, as long as the manual switch 187 is in its circuit closing position, in which it will be carried when it is desired that the brake be released, the motor 156 and gear pump will be caused to start and stop as required to maintain the necessary liquid in pressure chamber 126 to retain the brake lever 55 between the dot and dash lines 194 and 194a in which the brake is released.

From the above remarks it will now be seen that if there is no leakage of liquid from chamber 126, the motor 156 and the gear pump will operate only the once for effecting a release of the brake. In case of leakage however the motor and pump will operate only as required to compensate for such leakage. At all other times the motor 156 and pump will not be operating, and this is important in that it provides for economical operation of the system and long useful life of these parts.

When the operator desires to apply the brake he opens the switch 187 to thereby effect deenergization of the magnet 185 and to prevent operation of the motor 156 and pump. When this occurs, the pressure of the liquid in chamber 126 acting on the piston 124 and also effective on the magnet controlled valve 177 moves said valve away from its seat to thereby provide for flow of liquid from said chamber past said valve to passage 174 and thence to the reservoir 120. When the pressure of liquid on piston 124 is thus relieved, the spring 72 is rendered effective to rock the brake lever 55 in a counterclockwise direction to thereby actuate the brake shaft 45 and cam 47 to move the brake shoes 36 and 37 into contact with the brake drum 25 for braking the axle 1. It will be noted that the application of the brake is attained by the energy stored in spring 72 upon the release of liquid pressure in chamber 126 on the piston 124.

When the operator desires to release the brake, he closes the switch 187 to effect energization of magnet 185 and thereby seating of valve 177. With the brake lever 55 in the brake application position, the movable contact 190 in the switch device 189 will be bridging the fixed contacts 191 and 192 so that the motor 156 will be caused to operate the gear pump to again displace liquid past the check valve 164 into chamber 126 below the piston 124 for moving the piston 124 in an upwardly direction against the opposing pressure of the application spring 72 to thereby rock the brake lever 55 back to the position required for releasing the brake. The brake will then be held released by such operation of the electric motor 156 and gear pump under the control of the switch 189 and brake lever 55 as required to maintain the necessary degree of liquid in the piston chamber 126, as previously described.

If for any reason, such as failure of electric power for operating the motor 156 and gear pump, it would be impossible to pump liquid into piston chamber 126 for effecting a release of the brake, then the brake as applied by spring 72 may be released by manual movement of the latch 88 out of locking relation with the lever 81 whereupon the compressive force of spring 72 will urge the sleeve 78 in an upwardly direction and relieve the force of said spring on the brake lever 55. With the brake lever 55 thus relieved of force from spring 72, the spring 50 connecting the two brake shoes 36 and 37 may return same to their brake release position, so that the vehicle may be moved.

When subsequently the cause for such failure as just described has been corrected, the lever 81 may be returned to its normal position shown and with the switch 187 closed, the magnet controlled valve 177 will be seated and the motor 156 and gear pump will then again restore the liquid in chamber 126 for releasing the brake as above described.

*Description—Figure 8*

In the embodiment of the invention above described the desired operation of the switch 189, electric motor 156 and thereby the gear pump is dependent upon proper adjustment of the brake lever 55 with respect to the brake shoe operating cam 47. If for instance the slack adjuster including gear 57 connecting the brake lever 55 to the brake shaft 45 should be so improperly adjusted as to permit engagement of surfaces 196 on the cam 47 before the brake lever 55 could obtain the position shown in the drawings for operating the switch 189 to open the motor circuit, then the motor circuit would remain closed and the motor would continue to operate and cause the gear pump to build up an excessive pressure on piston 124 which might cause damage to or breakage of various parts of the mechanism and which would also result in excessive wear of the motor and gear pump and reduce the life thereof. While proper adjustment of the brake will avoid this undesirable condition, it may also be avoided by controlling the motor circuit by a switch controlled independently of the position of the brake lever 55 in the manner shown in Fig. 8, which will now be described.

According to this embodiment the switch 189 and operating plunger 195 therefore are replaced by a switch having an operating lever 197 to perform the same function as the switch 189 and plunger 195, this new switch being located in an extension 198 from one side of the casing of the control device 100. The cover 135 containing the pump gears 139 and 138 is replaced by a cover 199 embodying all of the parts of the cover 135 and in addition having a piston bore 200 containing an accumulator piston 201. This piston has at one side a pressure chamber 202 open to the annular chamber 168 provided around the check valve cage 160 and at the opposite side a non-pressure chamber containing a control spring 203 bearing at one end on a cap nut 204 which closes the open end of bore 200, and bearing at the opposite end on the piston 201. A rod 205 connected at one end to the piston 201 extends through the cap nut 204 and is provided at its outer end with a yoke 206 having an opening 207 in which the switch arm 197 is disposed. The end of the yoke 206 adjacent the piston 201 provides a shoulder 208 for engaging the cap nut 204 to prevent movement of the piston 201 and rod 205 past the circuit closing position of the switch arm 197 in which position said arm is shown.

In operation, when the pump is operating to displace liquid into piston chamber 126 for actuating the piston 124 to move the brake lever 55 to its brake release position, liquid at the same time will be displaced into chamber 202 to act on the piston 201 for moving same against the opposing force of spring 203, it being noted that both these piston chambers are in communication with the annular cavity 168 surrounding the valve cage 160 and thereby in constant communication with each other.

As the pressure of liquid is thus increased in piston chamber 202, the piston 201 is gradually moved in the direction of the left-hand and such movement continues until the right-hand end of the opening 207 through the piston rod yoke 206 contacts the switch arm 197 and causes same to move from the circuit closing position in which it is shown in the drawings to a circuit opening position indicated by a line 209. In this circuit opening position the motor 156 and gear pump will be stopped. The pressure required on piston 201 to thus operate the switch arm 197 will also cause the brake control piston 124 to condition the brake lever 55 to release the brakes.

In case there is leakage of liquid from piston chamber 202 or piston chamber 126, due to any cause whatsoever, then the spring 203 will gradually move the piston 201 back toward the position shown and when this movement becomes sufficient to shift the switch arm 197 from its circuit opening position to the circuit closing position shown, the motor 156 and gear pump will again be caused to operate to restore such liquid in order to maintain the brake released. Thus in case of leakage the pump will be caused to alternatively start and stop as required for maintaining a sufficient degree of liquid in the chambers 202 and 126 to maintain the brake in a released condition, it being noted however that such starting and stopping of the motor and pump is controlled by spring 203 and is thus independent of the brake lever 55 or other parts of the mechanism so that improper adjustment of the brake lever with respect to the brake shoes will have no influence upon operation of the pump.

As described in connection with the embodiment of the invention shown in Figs. 1 to 7, the brake lever 55 is movable through a range between dot and dash lines 194 and 194a for controlling the switch 189 to maintain the liquid in pressure chamber 126 against leakage and in which range the brake is held released. Although this range of movement of brake lever 55 is not objectionable, it is unnecessary with a construction shown in Fig. 8 since the pressure maintained in chamber 126 on the piston 124 as controlled by spring 203 on the accumulator piston 101, may be such as to maintain the piston 124 and brake lever 55 in their uppermost position throughout the range of pressure change in chamber 126 between stopping and starting of the pump, as governed by spring 203. In other words, the spring 203 may be of such value as to cause the pressure in chamber 126 to be maintained at a sufficient value for holding the piston 124 and brake lever 55 in a definite release position against the opposing pressure of the brake application spring 72.

*Description—Figure 9*

If desired, release movement of the brake lever 55 against the opposing force of the brake application spring 72 may be effected by compressed air supplied through a brake controlled pipe 212 shown in Fig. 9.

According to this embodiment the brake control device 100 is dispensed with and the brake housing 14 is provided with an integral cylinder 213 for receiving the brake release piston 124. In this cylinder the piston 124 has at its lower face a pressure chamber 214 formed between the piston and a cap nut 215 closing the open end of the bore in which said piston is disposed. A pipe preferably of the flexible type is connected at one end to the brake control pipe 212 and at the opposite end to the cap nut 215 which is provided with one or more passages 216 connecting the pipe to the pressure chamber 214.

In operation, a sufficient supply of compressed air to the pressure chamber 214 through the brake control pipe 212 will move the piston 124 against the opposing force of the brake application spring 72 to the position shown in the drawings for releasing the brake. Upon a reduction in pressure in pipe 212 and thereby in pressure chamber 214 the brake application spring 72 will be rendered effective to apply the brake. In other words, the piston 124 in this embodiment, controlled by the pressure of fluid or compressed air in chamber 214, will operate in the same manner as when controlled by the pressure of liquid in the embodiment above described to control the application and release of the brake.

*Summary*

It will now be seen that a relatively simple, compact and efficient brake is provided for braking an axle or rotating shaft such as the propeller shaft of a vehicle. The brake is of the type in which the force of a spring is employed for applying the brake and the pressure of fluid is used to release the brake against the spring force. Manual means is provided to render the spring ineffective in order that the brake may be released in case of failure of the supply of fluid pressure, so that under such a condition a vehicle equipped with the brake may be moved out of traffic and to a repair shop or the like.

The brake embodies a lever which straddles the member to be braked. One end of this lever is connected to the brake and the other end to the brake operating and control means which is located immediately adjacent one side of the member to be braked thereby providing a compact structure which is capable of application to certain present day vehicles on which the space available for a brake is often relatively small.

The hydraulic brake control apparatus is a self-contained unit capable of remote control electrically and with all liquid control parts contained within the one casing to that the possibility of leakage and loss of liquid and thereby the loss of brake control is reduced to a minimum. This is important in that it provides an arrangement which is particularly practicable for use in service such as of the railway type. Moreover, the hydraulic unit is resiliently supported from the actual braking means in order to prevent the transfer of damaging vibration to said unit and thus provide relatively long life of the unit.

Of importance is the structure which provides for operation of the electric motor and liquid displacement pump only as required to maintain a sufficient displacement of liquid to hold the brake released. This structure avoids needless operation of the pump and motor and provides for long useful life thereof.

Having now described my invention, what I claim as new and desire to secure by Letters Patent, is:

1. A brake apparatus comprising in combination with a rotatable member to be braked, a housing encircling at least a portion of said member, a brake for said member, a lever carried by said housing and operatively connected at one side of said member to said brake for controlling the operation thereof, said lever extending from said one side of said member to the opposite side thereof, a spring carried by said housing and acting on the end of said lever at said opposite side of said member for actuating said lever to operate said brake to brake said member, means carried by said housing at said opposite side of said member and acting on said lever for moving same against said spring to release said brake, a member slidably mounted in said housing for rendering said spring either effective or ineffective, releasable means having a normal position for rendering said member effective and operable upon being released to provide for movement of said member to render said spring ineffective, and a latch for securing said releasable means in said normal position and operable manually to release said releasable means for movement out of said normal position.

2. A brake apparatus comprising in combination with a rotatable member to be braked, a housing in which said member is journaled, a brake for said member, a lever straddling said member and having at one end a journal connection with said housing and operative upon rocking in one direction to actuate said brake to brake said member and in the opposite direction to release said brake, a spring disposal in said housing at the opposite side of said member and acting on the opposite end of said lever for effecting movement thereof in said one direction, a piston in said housing at said opposite side of said member operatively connected to said lever, said piston having at one side a pressure chamber to which fluid under pressure is adapted to be supplied for actuating said piston to rock said lever in the opposite direction against the force of said spring to release said brake, means for varying the pressure of fluid on said piston, and means operative to relieve said spring of force for thereby rendering said spring ineffective.

3. A brake for a rotatable member comprising in combination with said member a fixed housing for said member, a shaft journaled in said housing at one side of said member and operable upon rocking in one direction to brake said member and in the opposite direction for releasing the brake on said member, a lever straddling said member and having one end connected with said shaft for rocking same, a spring carried by said housing at the opposite side of said member, a fluid pressure controlled piston carried by said housing at said opposite side of said member, said spring and piston being arranged in substantial coaxial relation, means connecting one end of said spring and said piston to the end of said lever opposite that connected with said shaft, said spring being adapted to operate upon a reduction in pressure of fluid on said piston to rock said lever in said one direction, an increase in pressure of fluid on said piston to a degree exceeding the force of said spring being operative to rock said lever in said opposite direction, means for varying the pressure of fluid on said piston, means in said housing supporting the other end of said spring for rendering said spring effective, and means operative manually to release the spring supporting means for movement relative to said housing under action of said spring to thereby render said spring ineffective.

4. A brake apparatus for a rotatable member comprising in combination with said member a housing enclosing said member, a brake for said member, a shaft carried by said housing at one side of said member and operable upon rocking in one direction to actuate said brake to brake said member, and operable upon rocking in the opposite direction to release said brake on said member, a lever straddling said member and having one end connected to said rock shaft for rocking same, a coil spring at the opposite side of said member acting on said lever for actuating same to rock said shaft in the direction for actuating said brake to brake said member, a sleeve slidably mounted in said casing at said opposite side of said member, said spring being interposed between said sleeve and lever, a latch, an element having a rockable connection with said casing and cooperative with said latch for holding said sleeve in a condition for rendering said spring effective, said latch being manually operative to release said element from said sleeve to provide for movement of said sleeve relative to said casing under the action of said spring for rendering said spring ineffective, means associated with said casing at said opposite side of said member and connected with said lever and selectively operative to either rock said lever against said spring or to provide for movement of said lever by said spring, and means for controlling the last named means.

5. A brake apparatus for a rotatable member comprising in combination with said member, a housing for said member, a brake for said member carried by said housing, a lever carried by said housing for controlling said brake, a spring carried by said housing and acting on said lever for actuating same to operate said brake to brake said member, a piston associated with said housing and connected to one end of said lever and adapted to be operated by an increase in pressure on one face to operate said lever against said spring to release said brake on said member and adapted to provide for operation of said lever by said spring upon a reduction in the pressure of said fluid, and a device carried by said housing operative to supply fluid under pressure to actuate said piston and to release fluid under pressure therefrom for controlling the operation of said lever and thereby said brake.

6. A brake apparatus for a rotatable member comprising in combination with said member, a housing for said member, a brake for said member carried by said housing, control means carried by said housing for controlling said brake, spring means carried by said housing and acting on said control means for actuating same to apply said brake, and fluid pressure means for actuating said control means to release said brake against said spring means comprising a casing, resilient means connecting said casing to and supporting same from said housing, piston means in said casing, means connecting said piston means with said control means for rendering said piston means operative upon an increase in fluid pressure on one face to actuate said control means to release said brake against said spring means and to provide for operation of said control means by said spring means upon a reduction in fluid pressure on said piston means, and means carried by said casing operative to selectively increase and reduce the pressure of fluid on said piston means.

7. A brake apparatus for a rotatable member comprising in combination with said member, a housing for said member, a brake associated with said member for braking same, a movable member carried by said housing for controlling said brake, spring means carried by said housing acting on said member for actuating same to apply said brake and a fluid pressure control device for said brake comprising a casing, means resiliently securing said casing to and supporting said casing from said housing, a piston in said casing connected with said member and adapted to be subjected to pressure of fluid for opposing the pressure of said spring means and operative upon an increase in fluid pressure to a chosen degree to actuate said member against said spring means to release said brake, and operative upon a reduction in fluid pressure to below said chosen degree to render said spring means effective, a pump in said casing operative to provide fluid pressure on said piston for controlling the operation thereof, an electric motor secured to said casing and connected to said pump for operating same, a valve in said casing for releasing fluid under pressure from said piston, electrically controlled means carried by said casing and connected to said valve for controlling its operation, a control switch having a normal position for supplying current to said electric motor and for effecting operation of said electrically controlled means to close said valve and having another position for cutting off the supply of electric current to said motor and for effecting operation of said electrically controlled means to provide for opening of said valve, and a switch controlling the circuit between said control switch and motor and controlled in accordance with the pressure of fluid delivered by said pump and operative to close the circuit controlled thereby when such pressure is below said chosen degree and to open such circuit upon an increase in such pressure to a certain degree above said chosen degree.

8. A brake apparatus for a rotatable member comprising in combination with said member, a housing in which said member is journaled, a brake carried by said housing for braking said member, a lever carried by said housing for actuating said brake, spring means carried by said housing operative on said lever for actuating same to operate said brake to brake said member, a control device comprising a casing, means resiliently securing said casing to and supporting said casing from said housing, a piston in said casing having at one side a pressure chamber, strut means connecting said piston in said casing through openings in said casing and housing to said lever for rendering said piston operative by a chosen degree of fluid pressure in said chamber to actuate said lever against said spring means for releasing said brake on said member, said piston being operative upon a reduction in pressure in said pressure chamber to below said chosen degree to render said spring effective, a resilient gasket interposed between said housing and casing around the openings through which said strut means extends, a reservoir in said casing containing a quantity of liquid, a displacement pump in said casing operative to draw liquid from said reservoir and to force same into said pressure chamber, a motor carried by said casing and connected to said pump by actuating same, a valve in said casing controlling communication between said pressure chamber and said reservoir and operative when opened to release liquid from said pressure chamber and when closed to provide for an increase in pressure in said pressure chamber by operation of said pump, a magnet carried by said casing connected to said valve and operative upon energization to seat said valve and upon deenergization to provide for opening of said valve, a control switch having one position for supplying electric current to said motor and to said magnet and another position for cutting off such supply of current, and a switch controlling the circuit between said control switch and motor operative in accordance with the pressure of fluid in said pressure chamber to close the circuit to the motor when such pressure is below said chosen degree and to open such circuit upon an increase in pressure in said pressure chamber to a degree above said chosen degree.

9. A brake apparatus for a rotatable shaft comprising in combination with said shaft a housing in which said shaft is journaled, a rotatable member to be braked secured to turn with said shaft, braking means for said member carried by said housing, a brake shaft journaled in said housing at one side of and extending parallel to said rotatable member, and operative to control said braking means, a brake lever straddling said member and connected at one end to said shaft and operative upon movement in one direction to actuate said shaft and thereby said braking means to brake said member and upon rocking movement in the opposite direction to release said braking means from said member, a spring in said housing disposed at the side of said rotatable member opposite said brake shaft and operatively connected to the opposite end of said lever for actuating same to operate said braking means to brake said rotatable member, a brake control device disposed at one side of said housing, resilient means resiliently securing said device to and supporting same from said housing, a piston in said device connected with said opposite end of said lever and having at one side a pressure chamber, said piston being adapted to operate upon an increase in fluid pressure in said pressure chamber to move said lever against said spring to provide for a release of said braking means and upon a reduction in pressure in said pressure chamber to render said spring means effective, a displacement pump in said device operative to force liquid under pressure to said pressure chamber for acting on said piston to control its operation, a valve in said device operative to release fluid under pressure from said pressure chamber to render said spring means effective, an electric motor mounted on said device and connected with said pump for actuating same, an electromagnet mounted on said device and connected with said valve and operative upon energization to actuate said valve to prevent release of fluid under pressure from said pressure chamber upon deenergization to provide for release of fluid under pressure from said pressure chamber, a manually operative switch having one position for supplying electric current to said motor and to said electromagnet and another position for cutting off such current supply, and a circuit breaker in the connection between said manually operative switch and motor operative in accordance with the pressure of fluid in said chamber to open the circuit to said motor upon an increase in pressure in said pressure chamber to a degree required for actuating said lever for releasing said braking means and to close such circuit when the pressure in said pressure chamber is of a lower degree.

10. A combined braking and propulsion structure for a driving axle of a self-propelled vehicle having a driving motor and a drive shaft for transmitting power from said motor to said axle, said structure comprising in combination, with said shaft and axle, a secondary shaft, means securing said secondary shaft to said axle for rotation therewith, a rotatable brake element secured to turn with said secondary shaft, means connecting the driving end of said drive shaft to said brake element for transmitting propulsion forces to said axle, a relatively stationary housing enclosing said axle, a secondary housing for said secondary shaft carried by the axle housing, bearings in said secondary housing supporting said secondary shaft, braking means carried by said secondary housing for cooperation with said brake element to brake said secondary shaft and thereby said axle, control means for said braking means, and resilient means resiliently securing said control means to and supporting same from said secondary housing.

11. A brake apparatus for a rotatable member comprising in combination with said member, a housing for said member, a brake for said member carried by said housing, a lever carried by said housing for controlling said brake, a spring carried by said housing and acting on said lever for actuating same to operate said brake to brake said member, a piston associated with said housing and connected to one end of said lever and adapted to be operated by an increase in pressure on one face to operate said lever against said spring to release said brake on said member and adapted to provide for operation of said lever by said spring upon a reduction in the pressure of said fluid, fluid control means carried by said housing for increasing and decreasing the pressure of fluid on said piston, electrically operable means carried by said housing for controlling said fluid control means, and means for controlling said electrically operable means.

12. A brake apparatus for a rotatable member comprising in combination with said member, a housing for said member, a brake for said member carried by said housing, a lever carried by said housing for controlling said brake, a spring carried by said housing and acting on said lever for actuating same to operate said brake to brake said member, a piston associated with said housing and connected to one end of said lever and adapted to be operated by an increase in pressure on one face to operate said lever against said spring to release said brake on said member and adapted to provide for operation of said lever by said spring upon a reduction in the pressure of said fluid, a control device comprising electrically controlled displacement means operative to increase the pressure of fluid on said piston, electrically controlled means operative to reduce the pressure of fluid on said piston, resilient means securing said control device to and supporting same from said housing, and manually controlled means for controlling both of said electrically controlled means.

ARTHUR G. LARSON.